United States Patent [19] [11] 4,124,684
Olivier et al. [45] Nov. 7, 1978

[54] CONTINUOUS PRODUCTION OF LITHIUM CARBONATE

[75] Inventors: Charles A. Olivier; Jean J. Panneton; Jacques Perusse, all of Ste-Foy, Canada

[73] Assignee: Ministere des Richesses Naturelles, Gouvernement du Quebec, Quebec, Canada

[21] Appl. No.: 823,143

[22] Filed: Aug. 9, 1977

[30] Foreign Application Priority Data

Aug. 10, 1976 [GB] United Kingdom ............... 33273/76

[51] Int. Cl.$^2$ .............................................. C01D 7/00
[52] U.S. Cl. ................................................. 423/179.5
[58] Field of Search ...................... 423/179.5, 186, 209, 423/421

[56] References Cited

U.S. PATENT DOCUMENTS

| 2,331,838 | 10/1943 | Lindblad et al. ................... | 423/179.5 |
| 3,073,673 | 1/1963 | Chubb ............................... | 423/179.5 |
| 3,112,170 | 11/1963 | Archambault et al. ............ | 423/179.5 |
| 3,112,171 | 11/1963 | Archambault ..................... | 423/179.5 |

FOREIGN PATENT DOCUMENTS 770,812   3/1957   United Kingdom .................. 423/179.5

OTHER PUBLICATIONS

Ellestad et al., "Extraction of Lithium from its Ores," Transactions AIME, (Nov. 1955), Mining Engineering, pp. 1045–1047.
Jacobson, Encyclopedia of Chemical Reactions, vol. VI, (1956), p. 285, Reinhold Publishing Corp.

Primary Examiner—O. R. Vertiz
Assistant Examiner—Wayne A. Langel
Attorney, Agent, or Firm—Browdy and Neimark

[57] ABSTRACT

Lithium carbonate is derived from a calcined lithium-bearing silicate in a continuous cyclic process in which the silicate is decomposed in aqueous medium with sodium carbonate at a selected temperature and pressure, the resulting slurry is cooled and leached with carbon dioxide, and the resulting lithium bicarbonate-bearing soluton is heated to derive lithium carbonate and a mother liquor, which is recycled to the decomposition step. The amount of aqueous liquid used in the decomposition step is reduced to a minimum and the leaching accomplished without further dilution. This results in contamination of the recycled mother liquor with bicarbonate ions, which normally act to inhibit a high yield of lithium carbonate. The process conditions are controlled to reduce this inhibiting effect. Preferably, this control is effected by selecting a relatively low reaction temperature accompanied by neutralizing the mother liquor. Less desirably, the control is effected by selecting a relatively higher temperature and regulating it closely.

15 Claims, 2 Drawing Figures

CONTINUOUS PRODUCTION OF LITHIUM CARBONATE

BACKGROUND OF THE INVENTION

1. Field of the Invention

This invention relates to a continuous cyclic process for producing lithium carbonate from calcined lithium-bearing silicates of which beta spodumene is a preferred species.

2. Description of the Prior Art

The cyclic process described in U.S. Pat. No. 3,112,171 Archambault (1963) calls for the use of a large proportion of water to solids, for example, in the decomposition, cooling, and insolubilizing steps. This results in a high energy drain. The applicants have found that attempts to lower the amount of water to make the process more attractive commercially introduces other problems.

STATEMENT OF THE INVENTION

Accordingly, it is an aim of the present invention to provide a continuous cyclic process in which the relative amount of water to solids employed is reduced and, at the same time, the resulting problems are overcome.

A process, according to the invention, proceeds as follows. A mixture is formed of a calcined lithium-bearing silicate with sodium carbonate, in excess over the stoichiometric amount to react with the lithium in the silicate and a limited amount of aqueous liquid effective to form a pumpable slurry, preferably from about 1.8 times to about 2.5 times by weight of the amount of solids so as to produce a slurry containing from about 7.5 to 17 grams per liter of lithium. The aqueous liquid is made up of recycled liquid from subsequent steps and enough added water to maintain a pumpable consistency in the slurry. The slurry is then heated to a selected reaction temperature under pressure while being agitated for a time effective to decompose the lithium-bearing silicate and form in the slurry solids containing crystalline lithium carbonate and sodium aluminosilicate. A preferred temperature is within the range from about 175° C. to about 250° C. with the pressure in the range from about 115 to about 620 psig. The mixture is then cooled to a leaching temperature within the range from about −10° C. to about 40° C. and leached with carbon dioxide at at least atmospheric pressure, without increasing the amount of aqueous liquid in the mixture, to provide a lithium bicarbonate-bearing solution and a solid residue. The lithium bicarbonate-bearing solution is separated from the solid residue. The solution is heated and agitated to drive off carbon dioxide gas and to provide a precipitate of solid crystalline lithium carbonate and mother liquor. The solid lithium carbonate is separated from the mother liquor which the applicants have found to contain traces of lithium, unreacted sodium and bicarbonate ions.

The applicants have found that, unexpectedly, the presence of bicarbonate ions in the mother liquor interferes with obtaining a high yield of lithium carbonate, and special steps have to be taken to eliminate this problem. Where the decomposition step is conducted at a temperature within the range below 230° C. and preferably below about 220° C., the mother liquor is treated to lower the bicarbonate ions concentration, preferably substantially to a minimum, by neutralization and the treated mother liquor returned to the decomposing step. The lithium carbonate is recovered and the carbon dioxide driven off in the insolubilizing step is recycled to the leaching step.

The applicants have found that, unexpectedly, in this way, the yield of lithium carbonate in the cyclic process may be raised considerably. At the comparatively low levels of water present in the applicants process, the bicarbonate ions content may run as high as about 22 grams per liter and at least about 9 grams per liter, while at decomposition temperatures below about 230° C. and especially below about 220° C. the yield of lithium extraction runs respectively from about 83% to, at the most, about 90%. By treating the mother liquor to reduce the bicarbonate ions substantially to a minimum the applicants have been able to realize a yield of extraction which runs to about 95% or more.

The neutralization may be carried out at an appropriate location in the reaction circuit. Neutralization is preferably effected by raising the pH of the mother liquor to at least about 11.4 whereby the bicarbonate ions are substantially neutralized to a level not greater than 2 grams per liter. Neutralization is preferably done by the use of a neutralizing agent which does not introduce new ions into the solution. Preferred neutralizing agents are lithium, sodium or calcium hydroxides.

The applicants have also found that the interference, with the yield of lithium carbonate, of bicarbonate ions in the mother liquor, separated from the lithium carbonate, can be minimized at the higher temperatures above about 215° C. and especially above about 230° C. by temperature control. Accordingly, at these higher temperatures the neutralization step may be omitted in favor of close temperature control. The applicants prefer, however, to operate within the lower temperature ranges where control over the process can be effected by controlling the pH in the neutralization step since temperature control presents operating difficulties.

BRIEF DESCRIPTION OF THE DRAWINGS

The invention thus generally described will now be referred to in more detail by reference to the accompanying drawings which are flowsheets illustrating procedures according to the invention, and in which.

DESCRIPTION OF THE PREFERRED EMBODIMENTS

Calcined spodumene and sodium carbonate are fed to a mixer A in the form of a heated tank equipped for agitation of the charge. Also added to the mixer A is liquid in which the bicarbonate ions have been decreased to a low value in a neutralizer tank K charged with liquid from a later step in the process and to which a neutralizing agent is added. In the mixer A, there is formed an aqueous slurry of sodium carbonate, water, and calcined lithium-bearing silicate and traces of lithium carbonate. The mixture is preferably preheated while mixing the constituents of the charge within the range from about 50° C. to about 90° C., but this preheating is not especially critical.

The slurry is continuously fed from the mixer A to a reactor B. In the reactor B, the temperature of the slurry is raised to reaction temperature, a desirable temperature being around 215° C. The reactor may take the form of one or more pressure vessels in which the pressure is maintained at least at or above the water vapor pressure at the selected reaction temperature. In the reactor, the calcined lithium-bearing silicate is converted to solid sodium aluminosilicate and slightly water-soluble lithium carbonate.

In this embodiment of the invention, the applicants like to operate at a temperature within the range from about 175° C. to about 230° C. (from about 200° C. to about 220° C. preferred) and at a pressure from about 115 to about 440 psig (with from about 220 to about 360 psig preferred), which pressure is maintained at higher than the water vapor pressure at the selected temperature, to favor a better control of the pressure vessel and thus inhibiting water vapor formation.

The slurry from the reactor B is continuously fed to a heat-exchanger-pressure reducer C in which the slurry is cooled to lower than boiling temperature. This reduces the pressure to atmospheric. Then, the aqueous slurry is further cooled to ambient temperature. During neither cooling stage is the slurry diluted. The device C is desirably a flash heat-exchanger which produces live steam which may be used to heat the reactor B or an insolubilizer F functioning at a later stage in the process.

At this point, it is possible, according to an optional aspect of the invention, to eliminate, by selective separation, part of the aluminosilicate almost free from lithium carbonate. Effectively, after the heat-exchanger-pressure reducer C, the slurry instead of being cooled to ambient temperature from boiling may be submitted, while still hot, i.e. at about 75° C. to 95° C. to a selective decantation in which step at least about 65% up to 90% of the sodium aluminosilicate may be eliminated without significant loss of lithium carbonate. This step reduces the subsequent liquid-solid separation and the amount of washing water needed.

Figure 2:
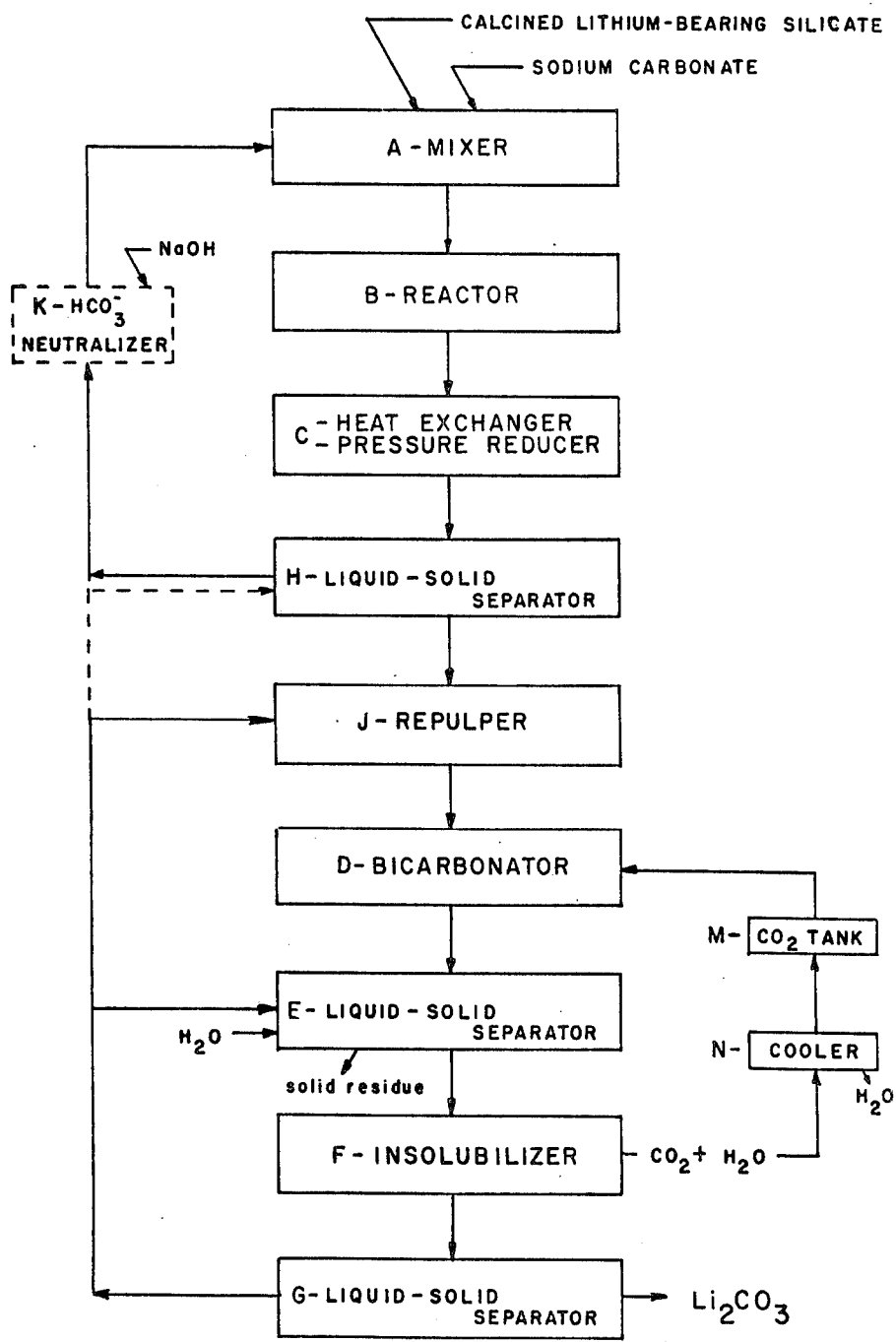
FIG. 2 shows a modification of the procedure of FIG. 1 in which the major part of the excess sodium carbonate is recycled to the makeup stage and the solids are reslurried with mother liquor from the lithium carbonate separation step.

Optionally, as shown in FIG. 2, instead of cooling the aqueous slurry to ambient temperature, the liquid from the liquid-solid separator H may be returned with mother liquor from a later stage in the process to the $HCO_3$ neutralizer tank K from which it is conducted to the mixer A.

Figure 1:
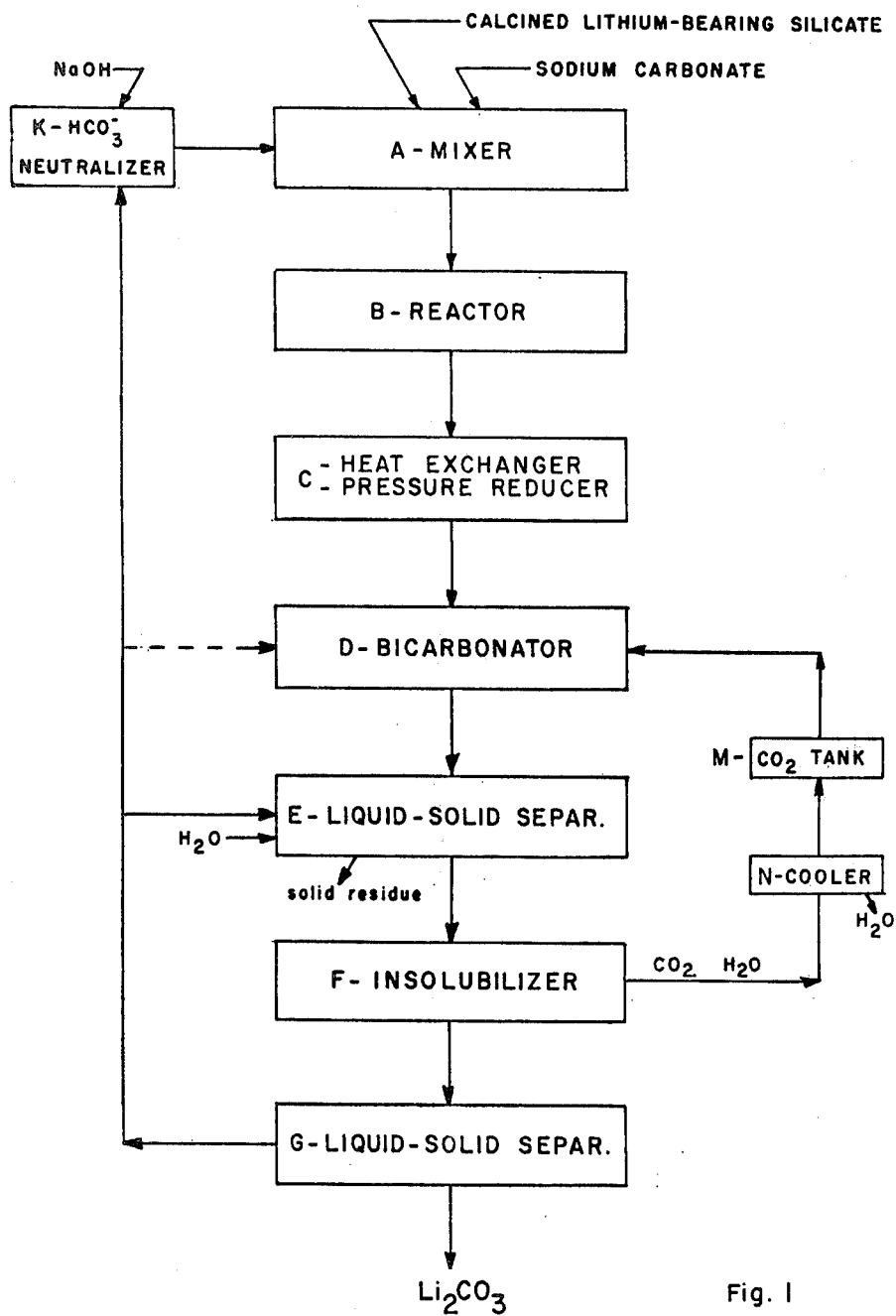
FIG. 1 shows one preferred procedure.

The slurry may either be passed directly from the heat-exchanger-pressure reducer C to a bicarbonate D (as in FIG. 1) or part of that slurry, from which the liquid has been removed, may be passed to a repulper J (as in FIG. 2) in which it is reslurried. The repulper J may receive liquid from a subsequent step of separating liquid from solid in a liquid-solid separator G, to replace any liquid that has been removed in the liquid-solid separator H. In the event that no liquid is removed in the liquid-solid separator H, liquid does not have to be circulated from the separator G to the repulper J.

In the repulper J, the charge is agitated while precooling it to ambient temperature. Then, it is passed to the bicarbonator D. In the bicarbonator D, carbon dioxide is bubbled through the slurry at a temperature and pressure effective to convert the lithium carbonate to lithium bicarbonate.

The slurry containing lithium bicarbonate and sodium aluminosilicate is then passed from the vessel D to the liquid-solid separator E. This separator may be a pressure filter or a vacuum filter, in which the slurry is subjected to filtration, to separate the liquor containing the lithium bicarbonate from the solid residue.

The pregnant liquor from the liquid-solid separator E is led to an insolubilizer F in which it is heated to precipitate from it the lithium carbonate. This precipitation is preferably effected in stages at different temperatures. Recycling lithium carbonate slurry from later stages back to earlier stages allows energy efficiencies, control of crystal growth and improved purity of the lithium carbonate.

For example, two or three precipitation stages may be employed, each having a temperature range of at least about 20° C., for example, the first stage from about 20° C. to about 60° C., the second from about 60° C. to about 80° C., and the third to boiling. This minimizes the amount of water evaporated and consequently the energy required, since part of the gas contains less water vapor. Part of the slurry from the last stage may be returned to the first stage. This results in larger and purer particles of lithium carbonate.

The material from the insolubilizer F is subjected, in the solid-liquid separator G, to separation of the lithium carbonate from the mother liquor. The mother liquor from the separator G is found to contain $HCO_3$ ions. This liquor is used partly to wash the solid residue in the separator E with most of it, about 85% to about 95%, however, being directed to the $HCO_3$ ions neutralizer tank K from which it is conducted to the mixer A.

In the separation of the lithium bicarbonate-bearing solution from the solid residue, care must be taken to prevent precipitation of lithium carbonate from the solution when the carbon dioxide pressure is released. Therefore, the applicants prefer to employ, as the liquid-solid separator E, a horizontal vacuum filter in which the time of filtration is short enough to prevent precipitation. A pressure filter may be employed for this separation, but it has the disadvantage of not being automatic.

The heat given off by the heat-exchanger-pressure reducer C may be used to supply the major part of the heat required in the reactor B. Alternatively, the heat given off by the device C may supply a major portion of the heat required by the insolubilizer F.

Carbon dioxide is supplied to the bicarbonator D from a storage supply M. Carbon dioxide released from the insolubilizer F, which will contain water vapor may be passed to the cooler N where the water is removed to form dried carbon dioxide which is recycled to the storage vessel M. Alternatively to neutralizing the mother liquor, as described, the applicants may control the inhibiting effect, on the yield of lithium carbonate, of bicarbonate ions in the mother liquor, by carrying out the decomposition step at a selected temperature above about 215° C. and preferably above about 230° C. In this event, the temperature must be carefully controlled. The applicants prefer to operate within the lower selected temperature range mentioned above and to control the inhibiting effect of the bicarbonate ions by neutralization.

The lithium-bearing minerals that are particularly amenable to treatment by the applicants' process are spodumene, petalite, eucryptite, lepidolite or lithium-mica.

Before being treated, the above mentioned silicates require a calcining treatment at temperatures of which the minima vary according to the minerals, from about 680° C. to about 980° C., to cause their crystal lattice to change or their dissociation to occur.

The invention will be further described with reference to the accompanying Examples which are illustrative and not limitative.

EXAMPLE I

In the process described in this example, apparatus was employed, substantially as described above and illustrated in the drawings.

Into an agitated mixer tank, heated to about 60° C., are continuously fed 380 g/min. of calcined lithium-bearing silicate analyzing 5.2% $Li_2O$, 68.5 g $Na_2CO_3$/min. and 800 ml/min. of the mother liquor from the liquid-solid separation of $Li_2CO_3$. The weight ratio of liquid to solid is 2.1 to 1. The excess of sodium carbonate over the stoichiometric amount required is about 15%. Such a slurry is pumped to two reactors in series in which the temperature is maintained at 210° C. and the pressure, at about 310 psig. The total reaction time in both reactors is about 1 hour. Then, the pressure and the temperature of the slurry are lowered, without dilution, by means of heat exchangers and control valves to ambient temperature and pressure. The reacted slurry is fed to two bicarbonation towers where it is leached with $CO_2$ gas, under a pressure of 150 psig, for about 35 minutes. A control valve allows the bicarbonated slurry to be fed to a horizontal filter where the solids are separated from the bicarbonated lithium rich liquor. The residue on the filter is washed and then discarded. The liquor, containing about 10.3 grams per liter of lithium is fed to a press filter to eliminate traces of solid residue. Then, it is fed to a bank of insolubilizer vessels, in this case two. The temperature in the first vessel is around 80° C. while in the second vessel, it is at 95° C. The conditions are set for a retention time of 2 hours in the insolubilizers. A liquid-solid separator recovers the solid lithium carbonate. The mother liquor is recycled to the mixing tank ahead of the process. The mother liquor analyses about 1.9 grams per liter of lithium and about 6.5 grams per liter of sodium. The lithium carbonate is 99.4% $Li_2CO_3$. The extraction yield at the reactor is around 91%.

This example shows that by reducing the amount of water substantially to a minimum throughout the process, the yield of lithium carbonate in a cyclic process is normally only about 91%.

EXAMPLE II

Using the same set up as in Example I, calcined lithium-bearing silicate, sodium carbonate and the mother liquor from the insolubilizing step are continuously fed to a reactor in which the temperature of the slurry is maintained at 215° C. under a total pressure of about 340 psig. The temperature of the reacted slurry is lowered to ambient temperature. The cooled slurry is fed to bicarbonation towers under a pressure of 150 psig $CO_2$. The bicarbonated solution is separated from the solid residue which is discarded after washing. The bicarbonated liquor is clarified in a filter press and then fed to the insolubilizing step. The solid $Li_2CO_3$ is separated from the mother liquor. The extraction yield ranged between 83% and 90%.

This example demonstrates the result of following the prior art, but lowering the amount of liquid as much as possible. It was found that the bicarbonate ions in the recycled liquid ranged from about 9.8 grams per liter to 22 grams per liter.

EXAMPLE III

Using the same set up as in Examples I and II runs were carried out in which the reactor temperature was 220° C. and the pressure 370 psig. The bicarbonate ions in the mother liquor were neutralized by NaOH before the liquor was used in the mixing tank ahead of the reactors. The reaction yield was within the range from 96% to 98%.

We claim:

1. A continuous cyclic process for producing lithium carbonate directly from calcined lithium-bearing silicates, comprising, continuously, reacting said silicate at a selected decomposition temperature and at a pressure higher than the water vapor pressure at the selected temperature with sodium carbonate in an amount of at least 1 mole of sodium carbonate per mole of lithium oxide present in the silicate and in the presence of an amount of an aqueous liquid from about 1.8 to about 2.5 times by weight of the amount of solids for a time effective to decompose the silicate to the point where substantially all the lithium in the silicate has been converted directly to the carbonate, thereby providing a mixture containing solid lithium carbonate and sodium aluminosilicate, without increasing its liquid content cooling the mixture and leaching it with carbon dioxide at a pressure at at least atmospheric to provide a solid residue and a lithium bicarbonate-bearing solution, separating the lithium bicarbonate-bearing solution from the solid residue, heating and agitating said lithium bicarbonate-bearing solution to drive off carbon dioxide gas and to provide a precipitate of solid crystalline lithium carbonate and mother liquor containing traces of lithium, unreacted sodium and bicarbonate ions, separating the mother liquor from the lithium carbonate and neutralizing it to reduce the bicarbonate ions substantially to a minimum, returning the neutralized mother liquor to the decomposing step, and recovering the lithium carbonate.

2. A process, as defined in claim 1, in which the selected temperature in the decomposition step is within the range from about 175° C. to about 250° C. and the pressure within the range from about 115 to about 620 psig.

3. A process, as defined in claim 1, in which the slurry from the decomposition step is cooled to a temperature within the range from about −10° C. to about 40° C. and the cooled slurry leached with carbon dioxide at a pressure from atmospheric to about 150 psig.

4. A process, as defined in claim 1, in which the pressure in the decomposition step is higher than the water vapor pressure at the selected temperature.

5. A process, as defined in claim 1, in which the carbon dioxide driven off in the insolubilizing step is recycled to the leaching step.

6. A process, as defined in claim 1, in which heat recovered from the cooling step is recycled to a previous step.

7. A process, as defined in claim 6, in which heat is recycled to the decomposition step.

8. A process, as defined in claim 6, in which heat recovered from the cooling step is applied to the insolubilizing step.

9. A process, as defined in claim 1, in which the insolubilizing step is carried out in a plurality of stages of increasing temperature whereby the amount of water evaporated is reduced substantially to a minimum and the water vapor in the carbon dioxide removed is reduced.

10. A process, as defined in claim 9, in which, in each stage, there is a temperature increase of at least about 20° C.

11. A process, as defined in claim 1, in which hot slurry from the decomposition, is submitted to a selective decantation to eliminate a major part of the residual sodium alumino-silicate without significant loss of lithium carbonate.

12. A process, as defined in claim 11, in which the hot slurry is set at a temperature between about 75° C. and about 95° C. and from about 65% to about 90% of the residual sodium alumino-silicate is eliminated.

13. A continuous cyclic process for producing lithium carbonate directly from calcined lithium silicate, comprising, continuously, reacting said silicate at a selected decomposition temperature within the range from about 175° C. to about 250° C. at a pressure within the range from about 115 to about 620 psig in an amount of at least 1 mole of sodium carbonate per mole of lithium oxide present in the silicate and in the presence of an aqueous liquid in an amount of from about 1.8 to about 2.5 times by weight of the solids for a time effective to decompose the silicate to the point where substantially all the lithium in the silicate has been converted directly to the carbonate, thereby providing a mixture containing solid lithium carbonate and sodium aluminosilicate, without increasing its liquid content, cooling the mixture to a temperature within the range from about −10° C. to about 40° C. and leaching the cooled slurry with carbon dioxide at a pressure from atmospheric to about 150 psig to form a lithium bicarbonate-bearing solution and a solid residue and separating the solution from the solid residue, heating and agitating said lithium bicarbonate-bearing solution in at least two stages of increasing temperature to drive off carbon dioxide gas to provide a precipitate of solid crystalline lithium carbonate and mother liquor containing traces of lithium, unreacted sodium and bicarbonate ions, separating the mother liquor from the lithium carbonate and neutralizing it to a pH of at least 11.5 to reduce the bicarbonate ions substantially to a minimum, and recovering the carbon dioxide driven off from the insolubilizing step and recycling it to the leaching step.

14. A process, as defined in claim 13, wherein the hot slurry from the decomposition is cooled to a temperature of from about 75° C. to about 95° C. and subjected to selective decantation to remove from about 65% to about 95% of the residual sodium aluminosilicate.

15. A continuous cyclic process for producing lithium carbonate directly from calcined lithium-bearing silicates, comprising, continuously, reacting said silicate at a selected decomposition temperature with an excess of sodium carbonate in the presence of a substantial minimum of water required to form an aqueous slurry for a time effective to decompose the silicate to the point where a major part of the lithium in the silicate has been converted directly to the carbonate, thereby providing a mixture containing solid lithium carbonate and sodium aluminosilicate, without increasing its liquid content cooling the mixture and leaching it with carbon dioxide at a pressure at at least atmospheric to provide a solid residue and a lithium bicarbonate-lithium solution, separating the lithium bicarbonate-bearing solution from the solid residue, heating and agitating said lithium bicarbonate-bearing solution to drive off carbon dioxide gas and to provide a precipitate of solid crystalline lithium carbonate and mother liquor containing traces of lithium, unreacted sodium and bicarbonate ions, separating the mother liquor from the lithium carbonate and neutralizing it to reduce the bicarbonate ions substantially to a minimum, returning the neutralized mother liquor to the decomposing step, and recovering the lithium carbonate.

* * * * *